United States Patent
Chau et al.

(10) Patent No.: US 9,131,069 B2
(45) Date of Patent: *Sep. 8, 2015

(54) SYSTEM AND METHOD FOR PROVISIONING TEMPORARY TELEPHONE NUMBERS

(71) Applicant: Ring Central, Inc., San Mateo, CA (US)

(72) Inventors: Vi Dinh Chau, San Francisco, CA (US); Naveen Gupta, Sunnyvale, CA (US); Rituparna Mukherjee, Mountain View, CA (US); Nisha K. Ahluwalia, San Francisco, CA (US)

(73) Assignee: RINGCENTRAL, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,472

(22) Filed: Feb. 12, 2014

(65) Prior Publication Data

US 2014/0162597 A1   Jun. 12, 2014

(51) Int. Cl.
*H04M 3/42* (2006.01)
*H04M 17/00* (2006.01)
*H04M 15/00* (2006.01)
*H04W 4/16* (2009.01)
*H04W 12/02* (2009.01)

(52) U.S. Cl.
CPC .......... *H04M 17/10* (2013.01); *H04M 3/42008* (2013.01); *H04M 15/09* (2013.01); *H04M 15/887* (2013.01); *H04W 4/16* (2013.01); *H04W 12/02* (2013.01)

(58) Field of Classification Search
CPC ................ H04M 3/42008; H04M 3/42085; H04M 3/42093; H04M 3/42102; H04M 3/42153; H04M 3/54; H04M 15/09; H04M 15/887; H04M 17/10; H04W 4/16; H04W 12/02
USPC ............. 379/201.01, 201.02, 201.11, 211.02, 379/213.01, 114.05
See application file for complete search history.

(56) References Cited

U.S. PATENT DOCUMENTS

| | | |
|---|---|---|
| 6,327,353 B1 | 12/2001 | Fukuzawa et al. |
| 7,013,132 B2 | 3/2006 | Kehr |
| 7,027,575 B1 | 4/2006 | Burgess |
| 7,245,712 B2 | 7/2007 | Hines |
| 8,693,655 B1 | 4/2014 | Chau |
| 2003/0147519 A1 | 8/2003 | Jain |
| 2006/0072726 A1 | 4/2006 | Klein |

*Primary Examiner* — Harry S Hong
(74) *Attorney, Agent, or Firm* — Stolowitz Ford Cowger LLP

(57) ABSTRACT

Systems, methods, and computer program products for provisioning a temporary disposable number are described. A user can be provided with a pool of available temporary disposable numbers that have a limited shelf life. The user can select one of the available temporary disposable numbers while submitting a permanent phone number associated with a communications device (e.g., mobile phone, home phone, business phone, etc.). Prior to activating the selected temporary disposable number, the temporary disposable number is linked to the permanent phone number. After activation, when an incoming call to the temporary disposable number is received, the permanent phone number is identified to be associated with the temporary disposable number being called. The incoming call is then forwarded to the communications device on which the permanent phone number is established.

31 Claims, 9 Drawing Sheets

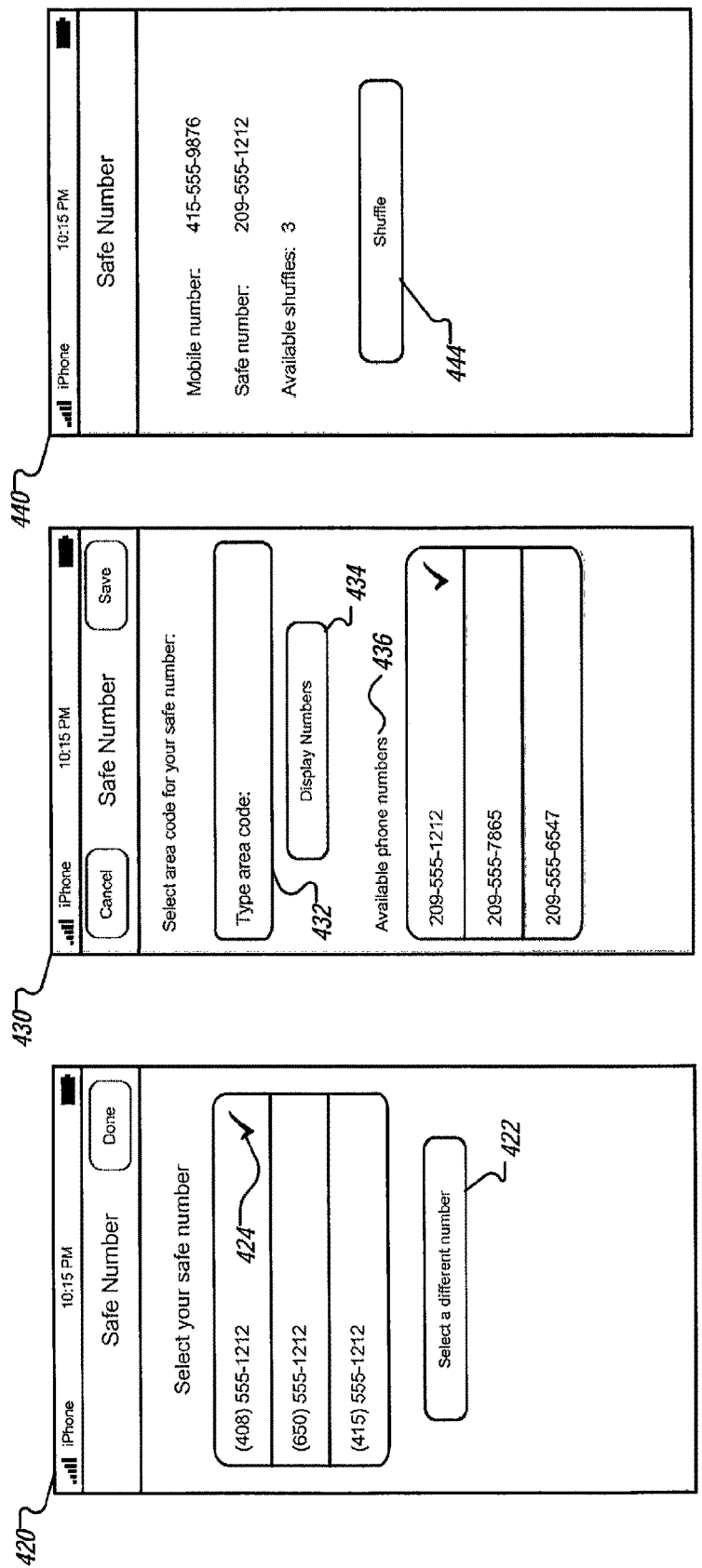

SYSTEM AND METHOD FOR PROVISIONING TEMPORARY TELEPHONE NUMBERS

The application is a continuation patent application of U.S. patent application Ser. No. 13/199,549, filed Aug. 31, 2011 entitled "SYSTEM AND METHOD FOR PROVISIONING TEMPORARY TELEPHONE NUMBERS," now issued as U.S. Pat. No. 8,693,655, which is herein incorporated by reference in its entirety.

TECHNICAL FIELD

The subject matter of this application is generally related to communications systems.

BACKGROUND

For security reasons, a caller may wish other parties to call but does not wish to divulge a permanent phone number to the calling party. One example is when selling an item, such as a car or a home. A seller may want to have interested parties contact the seller by calling them. However, for security and privacy reasons, the seller may not want to provide his or her home phone number. Other circumstances where a user may not want to divulge his or her permanent phone number include private sales of goods, invitations to group activities, requests to search for a lost article, or one-time business transactions with unknown parties.

SUMMARY

Systems, methods, and computer program products for provisioning a temporary disposable number are described. A user can be provided with a pool of available temporary disposable numbers that have a limited shelf life. The user can select one of the available temporary disposable numbers while submitting a permanent phone number associated with a communications device (e.g., mobile phone, home phone, business phone, etc.). Prior to activating the selected temporary disposable number, the temporary disposable number is linked to the permanent phone number. After activation, when an incoming call to the temporary disposable number is received, the permanent phone number is identified to be associated with the temporary disposable number being called. The incoming call is then forwarded to the communications device on which the permanent phone number is established.

In some implementations, a method is provided that includes receiving a user request for a temporary disposable identifier, the user request including a permanent identifier; identifying a listing of temporary disposable identifiers available for user selection; displaying the listing in response to the user request; receiving a user selection selecting a temporary disposable identifier from the listing; and activating the selected temporary disposable identifier based on the permanent identifier, the activated temporary disposable identifier being used to receive incoming calls at the temporary disposable identifier.

In some implementations, a method is provided that includes receiving a user request associated to extend a shelf life of a temporary disposable identifier, the temporary disposable identifier being used to receive incoming calls at the temporary disposable identifier; identifying a user account associated with the user request; determining whether the user account meets one or more criteria; and extending the shelf life of the temporary disposable identifier if the user account meets the one or more criteria.

In some implementations, a method is provided that includes providing user information including a permanent identifier established on a communications device; receiving a listing of temporary disposable identifiers in response to the user information including the permanent identifier, each temporary disposable identifier configured to allow incoming calls made to the temporary disposable identifier to be taken by the communications device; selecting a temporary disposable identifier from the listing; and receiving one or more incoming calls at the selected temporary disposable identifier.

In some implementations, a method is provided that includes receiving a user request for a temporary disposable identifier; retrieving a user account associated with the user request including determining whether there is sufficient credit in the user account to fulfill the user request; displaying a listing of temporary disposable identifier in response to the user request; receiving a user selection selecting a temporary disposable identifier from the listing; and activating the selected temporary disposable identifier if there is sufficient credit in the user account, the activated temporary disposable identifier being used to receive incoming calls at the temporary disposable identifier.

In some implementations, a system is provided that includes an account manager configured to receive a permanent identifier associated with a communications device and a selection of one of a plurality of temporary disposable identifiers; a database configured to store the plurality of temporary disposable identifiers and an association between the permanent identifier and the selected temporary disposable identifier; and an activation manager configured to activate the selected temporary disposable identifier such that incoming calls made to the selected temporary disposable identifier are forwarded to the communications device on which the permanent identifier is established.

Aspects of the invention can realize none, one or more of the advantages. The temporary disposable number feature described herein provides a means to shield one's identity for a limited duration, in multiple instances. The temporary disposable number feature can enable commercial businesses and individual business owners to extend and customize the features and benefits of the temporary disposable numbers to suit their business needs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4B shows an example temporary disposable number interface suitable for display on a mobile device.

FIG. 4C shows an example switching interface suitable for assisting a user in selecting a new temporary disposable numbers.

FIG. 4D shows an example shuffle interface displaying shuffle-related information.

Like reference symbols in the various drawings indicate like elements.

Figure 1:
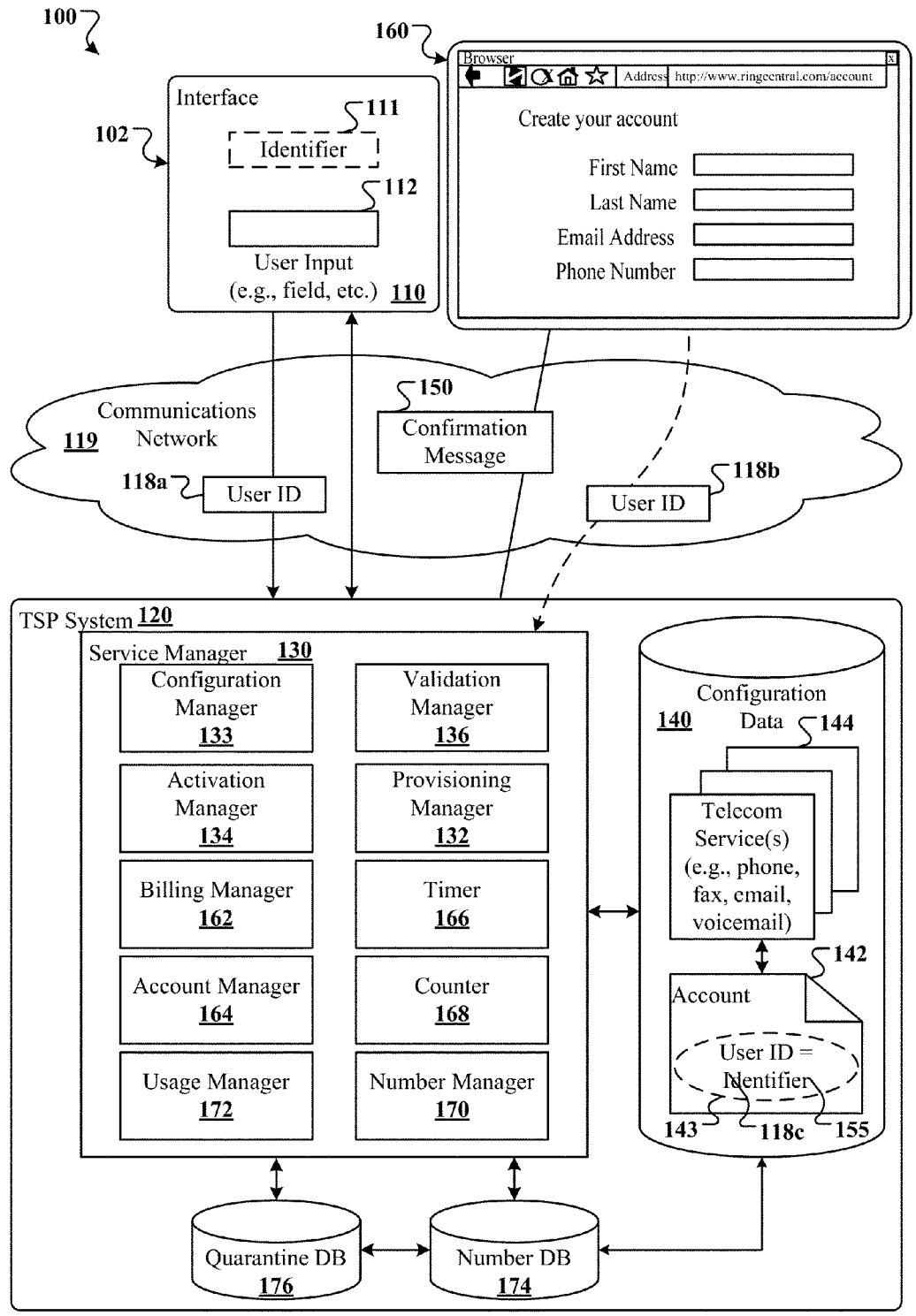
FIG. 1 illustrates an example virtual PBX service provider system that can be used to provision a temporary disposable number service via a mobile device or a browser.

Also, all materials and screenshots as described herein are protected by United States copyright law and may not be reproduced, distributed, transmitted, displayed, published or broadcast without the prior written permission of the assignee of record.

DETAILED DESCRIPTION

Systems, methods, and computer program products for provisioning a temporary disposable number are described. As will be described in greater detail below, a telecommunications service provider (TSP) system can provide users and subscribers with an option to subscribe to a temporary disposable number service. The TSP system can provide the users and subscribers with a pool of available temporary disposable numbers that have a predetermined expiration period or limited shelf life. A user can select one of the available temporary disposable numbers. At the time of selecting the available temporary disposable number, the user can be requested to submit a permanent phone number associated with a communications device (e.g., mobile phone, home phone, business phone, etc.). Prior to activating the selected temporary disposable number, the TSP system can link the temporary disposable number to the permanent phone number, and store this relationship in a database. After activation, when an incoming call to the temporary disposable number is received, the TSP system can determine the permanent phone number (e.g., by querying the database) as associating with the temporary disposable number being called. Once the TSP system has identified the relationship, the TSP system can forward the incoming call to the communications device on which the permanent phone number is established. When the user deactivates the temporary disposable number, the deactivated temporary disposable number can be placed in a quarantine database for a predetermined period during which the deactivated temporary disposable number is not available for user selection. This quarantine period allows the user to renew the deactivated temporary disposable number should a personal or business arise. After the quarantine period, the deactivated temporary disposable number can be placed back into the original pool of available temporary disposable numbers that can be selected by other users.

The temporary disposable number permits users and subscribers to be reachable to others while at the same time maintaining the confidentiality and security of their permanent phone number (e.g., office number, mobile phone number, or landline home number). Thus, users and subscribers who want to safe guard their personal or permanent phone numbers from third parties, such as advertising companies, businesses or outside vendors, can do so to protect their personal privacy and reduce security risks associated with divulging their permanent phone numbers without losing their accessibility to and channel of communication with others.

Because the temporary disposable number is valid a limited time (e.g., the temporary disposable number remains active for seven days) or for a limited usage (e.g., the temporary disposable number is valid for twenty calls), temporary disposable number provisioning can be an ideal application for any marketplace which facilitates the buying and selling of merchandises and services (e.g. eBay®, Craigslist®, ServiceMagic®, etc.). These marketplaces can leverage the temporary disposable number provisioning to offer buyers and sellers a contact number while sales transactions are occurring. For example, a user visiting a marketplace and creating a listing will be presented with an option to include a temporary disposable number to anonymize his or her personal phone number. If the user chooses to do so, the user can select a temporary disposable number from an inventory and immediately insert that number into the listing.

Alternatively, the entity associated with the marketplace (or other third party partner) can automate the temporary disposable number selection by submitting a request to the TSP system for a temporary disposable number on behalf of the user (e.g., upon receiving such a request from the user when compiling the listing), and inserting the temporary disposable number into the listing directly at the time of publishing the listing within the marketplace. The selected temporary disposable number would remain active to take inbound calls for as long as the listing remains active. When the listing is deleted, the number would be deactivated. For example, at the time of requesting a temporary disposable number, the marketplace can submit an expiration date of the listing to the TSP system, and when the listing expires and the marketplace removes the listing, the TSP system can also deactivate the temporary disposable number at the same time. As another example, at the time of removing the listing, the marketplace submits a request to the TSP system to deactivate the temporary disposable number. As will be discussed below, deactivated (or deleted) temporary disposable numbers can be placed in a quarantine database for a predetermined period during which the deactivated number can neither be listed nor displayed to other users for selection. The predetermined period, in one example, is proportional to how long a user account has been activated. For example, where the user account to which the deactivated temporary disposable number was linked has been active for a year, the predetermined period can be one month. As another example, where the user account has been active for one month, the predetermined period can be three days. The longer a user account has been active, the longer the predetermined period to allow a deactivated temporary number to be in quarantine.

Similar provisioning also can be used in social networks (e.g. Facebook®, LinkedIn®, etc.) and online dating sites (e.g. Match®, eHarmony®, etc.). As most social networking and online dating web sites focus on connecting individuals, the temporary disposable number provisioning can provide a platform to deliver a multi-way communication between subscribers and users within their respective user base.

For example, an online dating member can create a user profile and immediately add a temporary disposable number to the user profile for others to communicate with the member. The temporary disposable number can remain active for as long as the member retains the user profile. The member also has the ability to stop taking calls entirely, or forward callers directly to voicemail. For example, the member can set up a call-forwarding rule at the time of requesting a temporary disposable number such that calls made to the temporary disposable number are forwarded to the member's voicemail, or to another number (e.g., home, office, etc.) (e.g., a call made to a selected temporary disposable number is forwarded to the member's home number). The forwarding number(s) also can be extracted from an address book application installed on member's mobile device. As another example, at the time of selecting a temporary disposable number, the member can set up a mailbox to which calls ignored or missed by the member are forwarded (e.g., instead of forwarding to a home or office number).

Additionally, social networking sites and online dating sites now have the ability to extend the capability of a user profile to allow users to have multiple temporary disposable numbers simultaneously for enhancing security and reducing privacy concern. The temporary disposable number feature also allows a user to display a different temporary disposable number for different viewers viewing the user profile so that no caller can abuse a single temporary disposable number. In some implementations, calls to different temporary disposable numbers also can be logged and visible to the user when the user logs into the user account, and any voicemail will also be available to be played directly from the user account without needing to log into the service provider's system. For example, all calls to the temporary disposable number can be logged and stored in the database 140 as a log. The log can contain records of all calling parties, and such records can be cross referenced with the account manager 164 so that these records can be presented as call logs to the users identifying all calls made to the temporary disposable number when the user accesses the user account 142.

Even further, the temporary disposable number feature allows one single mobile device (or landline phones) to carry multiple lines of temporary disposable numbers to eliminate the need for multiple physical phones or multiple SIM cards (e.g., as with pre-paid phone cards). The user also can assign a different label to each different temporary disposable number for managing various accounts. At the user's leisure, any number can be shuffled (e.g., get new numbers), deleted, and parked (e.g., temporarily disabling a temporary disposable number), thus providing the user with the ultimate flexibility in call management.

Although the present disclosure is discussed below in the context of wireless access networks, the present disclosure is not so limited and that the temporary disposable provisioning also can be applied to packet switched or circuit switched networks in general such as, without limitation, Voice over Internet Protocol (VoIP) networks, Service over Internet Protocol (SoIP) networks, Asynchronous Transfer Mode (ATM) networks, Frame Relay networks, cellular networks, packet networks, and the like.

System Overview

FIG. 1 illustrates an example virtual PBX service provider system 100 that can be used to provision various types of telecommunications services including the temporary disposable number service and other types of virtual PBX services.

As described herein, "provisioning" refers to providing capabilities for telecommunications services (e.g., virtual PBX services) to a user or customer account, including transmission of voice, data, or both to a telephone number, facsimile number, email address, voicemail address, the like, or any combination thereof. This involves, for example, providing for the hardware, software, storage, processing power, administrative requirements and the like necessary for supporting the services for this account which can be a placeholder account not currently activated or associated with a particular user.

Referring to FIG. 1, the provider system 100 includes a TSP system 120, and the TSP system 120 can include a service manager 130 and a database 140. The service manager 130 can be configured to receive data representing a request to activate the temporary disposable number service. The temporary disposable number service provides users with one or more temporary disposable numbers that are configured to receive incoming calls only (e.g., users cannot use the temporary disposable numbers for dialing out or calling other parties).

As shown in FIG. 1, the data can include user identification information, such as user ID 118a or user ID 118b, either of which can be sufficient to activate the temporary disposable number service. The TSP system 120 can be configured to receive user IDs 118a and 118b via a communications network 119 from an interface 110 on a mobile device 102, or from a web browser 160.

The mobile device 102 and the web browser 160 can communicate with the TSP system 120, and submit the information entered by the user via the interface 110 or the web browser 160. The user ID 118a/118b can include existing login information for an existing user, or contact information, name, telephone number, email address, or a main telephone number entered by a new user. The database 140 can be configured to store the input data as configuration data 144 to be used for configuring the temporary disposable number service as well as other virtual PBX services that the TSP system 120 provides to all users and subscribers.

Where the user uses the mobile device 102 to activate the temporary disposable number service, the activation manager 134 can generate a notification to the mobile device 102 to confirm successful activation of the temporary disposable number service. Alternatively, the activation manager 134 can dial the temporary disposable number selected by the user to confirm its activation. Where the web browser 160 is used to activate the temporary disposable number service, a confirmation message 150 also can be sent to the user, for example, via email. Once the user has selected a temporary disposable number, the account manager 164 can associate the selected temporary disposable number with an identifier 155 as well as the user's user ID 118c.

The user IDs 118a and 118b also can represent a telephone number for the mobile device 102 or an email address of the user initiating a request for a temporary disposable number. Other identifiers also can be used as the user IDs 118a and 118b such as, without limitation, a facsimile number for a fax machine, a voice mail address, a page number, or another identifier that is unique to the user.

As discussed above, the interface 110 receives a user input that is then communicated to the account manager 134. The interface 110 can be generated by an application on the mobile device 102, or displayed to the user upon accessing the provider's website using the browser 160. The interface 120 can include an identifier 111 (e.g., a user name, account number, or identifier assigned by the account manager 134) that can be used as the user ID 118a, and an input field 112 configured to accept other form of user data, such as user authentication information (e.g., password).

The account manager 134 and a validation manager 136 can validate an activation of the temporary disposable number, and confirm the validation, for example, by generating a call or sending a confirmation message 150 to the user at the temporary disposable number. If a permanent phone number is used as the user identifier 111, the activation manager 134 can generate a call to the permanent phone number to confirm activation of the temporary disposable number. The confirmation message 150 also can include an automated-voice notification that the activation has been complete.

Alternatively, the confirmation message 150 can be sent to other contact endpoints provided by the user, such as an email address, a fax number, SMS address, or the like. Once the user (e.g., via mobile device 102) receives the confirmation message 150 from the activation manager 134 that the service is activated successfully, the application running on the mobile device 102 can present a summary page or confirmation to the user indicating such.

Prior to activating a temporary disposable number, the account manager 164 assigns the temporary disposable number to the permanent phone number associated with the mobile device 102. For example, at the time of selecting a temporary disposable number, the account manager 164 can require the user to identify the permanent phone number associated with the mobile device 102 (or permanent phone number with any communications device to which the temporary disposable number is to be linked). The permanent phone number then can be used as the user ID 118c. During the activation, the account manager 164 forms an association 143 between the temporary disposable number as selected by the user (e.g., as identifier 155) and the permanent phone number on record. The association can be stored in the database 140. When an incoming call to the temporary disposable number is received, the account manager 164 can query the database 140 and identify the permanent phone number corresponding to the temporary disposable number being called based on the association 143. Once the account manager 164 has identified the association 143, the account manager 164 can then link or forward the call to the communications device on which the permanent phone number is established.

In some implementations, the permanent phone number is required before a temporary disposable number can be assigned so that a temporary disposable number can have a permanent phone number associated with it. A permanent phone number can also be associated with multiple temporary disposable numbers. Once the permanent phone number is submitted, if the user tries to remove the permanent phone number from the user account 142 without adding another permanent phone number, a message can be indicated to the user that removing the permanent phone number on record can deactivate the temporary disposable number. The user also can be warned where the user tries to add a different temporary disposable number as a permanent phone number, and doing so can deactivate both temporary disposable numbers (e.g., if both were assigned by the TSP system 120).

As shown in FIG. 1, the TSP system 120 includes a services manager 120, and the service manager 130 can include one or more of the following: a provisioning manager 132, a configuration manager 133, the activation manager 134, the validation manager 136, a billing manager 162, the account manager 164, a timer 166, a counter 168, a number manager 170, and a usage manager 172.

The provisioning manager 132 can operate to provide the temporary disposable number service in association with, for example, a user account 142 once the user account 142 has been authenticated and activated. To provision the temporary disposable number service once a request has been made, the provisioning manager 132 can authenticate the user ID 118c and form an association between a designated permanent phone number and the selected temporary disposable number. The association then allows the account manager 164 to send calls to the temporary disposable number to be rung on the permanent number.

The configuration manager 133 can be used to assist the user in configuring the user account as well as other services provided by the TSP system 120. The configuration manager 133 also can communicate with the database 140 to ensure that the database 140 stores accurate and up-to-date user data and account information. For example, where the user has updated its account information, the configuration manager 133 can forward the updated information to the database 140 for storage.

As discussed above, the activation manager 134 can be configured to activate the user account 142 once it has been provisioned with configuration data 140 entered by the user. Where the user has selected a temporary disposable number, the provisioning manager 132 can associate the user's user ID 118c with the temporary disposable number as the identifier 155.

The validation manager 136, in conjunction with the activation manager 134, can be used to validate successful provisioning and activation of a temporary disposable number. For example, to validate a temporary disposable number, the validation manager 136 can be configured to make a call to the permanent number provided by a user (e.g., the number associated with the mobile device 102) using the selected temporary disposable number. In other examples, the validation manager 136 can send an email message to the email address of the user confirming that the temporary disposable number is now active or available to be activated (or deactivated). The validation manager 136 also can function to validate a temporary disposable number while the temporary disposable number is in use and active.

The billing manager 162 can manage the billing polices attributed to each temporary disposable number. The billing manager 162 can also configure the database 140 to store and transmit various billing polices to the billing manager 162 in determining the appropriate fee for each "rental" transaction. For example, the database 140 can store various billing polices that include free or for-fee (e.g., fixed or variable) billing policies, billing policies that are based on per-call, per-minute, or per-day schemes, or billing policies that charge the user a higher (or lower) fee for each subsequent temporary disposable number taken out beyond a set limit within a predetermined time frame (e.g., the user is charged a higher fee for each subsequent temporary disposable number after twenty numbers have been taken out within a 30-day period). In sum, the billing policies can establish various pricing structure by which the user can be billed for using a temporary disposable number.

Initially, the user can be given, for example, three free temporary disposable numbers at no charge. When the user requests a fourth temporary disposable number, the billing manager 162 can determine the appropriate usage fee for the fourth temporary disposable number based on the existing billing policies.

A promotional deal also can be given to users who purchase a "pack" of temporary disposable numbers. The user also can be given the flexibility to extend the shelf life based on a desired increment. For example, the billing manager 162 can permit the user to extend an active line by varying increments for an additional charge (e.g., $1 for each additional call, $2 for each additional day, etc.). As another example, the user can request the account manager 162 to set a different expiration date or time of an active temporary disposable number by a specific increment, and the billing manager 162 then can charge the user accordingly.

The billing manager 162 also can provide a billing interface through which the user can enter appropriate billing information, for example, to purchase additional "shuffle"

credits for the rights to extend the shelf life of a temporary disposable number currently in use, or the rights to use another new temporary disposable number. If desired, the user can purchase additional "shuffle" credits from outside vendors (e.g., Apple® or Google®) designated by the TSP system 120 as authorized dealers. In this example, the billing manager 162 then can be configured to interface with these outside vendors externally to ensure proper accounting and timely update to the user account to reflect these purchases and transactions.

As discussed above, the temporary disposable numbers can include one or more numbers that have a limited shelf life or term. For example, the temporary disposable number can include one or more numbers with a limited usage (e.g., valid for ten calls), a limited duration (e.g., valid for three, five, or seven days), or a combination thereof (e.g., valid for five calls in a single day). The timer 166 can monitor one or more these timing-related conditions of the temporary disposable numbers.

During operation, the timer 166 and the number manager 170 can function to set a time period during which a temporary disposable number is valid, and a flag in the database 140 indicating that the temporary disposable number is no longer available for selection by other users, respectively. When the timer 166 determines that the shelf life of the temporary disposable number has ended, the number manager 170 can reset the flag (e.g., after an appropriate quarantine period has expired) so that the temporary disposable number is available for others to select. For example, where the user has requested a temporary disposable number that is valid for three days, the timer 166 can track the duration for which the temporary disposable number is valid, and notify the number manager 170 to deactivate the temporary disposable number or place the temporary disposable number in quarantine at the end of the three-day period. As another example, the user can set a particular start time (and/or end time) of the temporary disposable number at the time of activating the temporary disposable number. The activation manager 134 can activate the temporary disposable number at the start time specified by the user (or deactivate the temporary disposable number at a desired end time), and the timer/counter 166 can then begin tracking the validity period of the temporary disposable number.

When a temporary disposable number has expired, the number manager 170 can place the expired temporary disposable number in a quarantine database 176 (formed as part of or external to the database 140) separate from the number database 174 containing all of the currently available temporary disposable numbers. The quarantine database 176 can store a list of all previously-linked temporary disposable numbers, and the number manager 170 can query the quarantine database 176 when a user renews one of the temporary disposable numbers previously linked to his or her account.

The timer 166 also can include a quarantine function (or a separate quarantine timer) to determine a length of time that the expired temporary disposable number has been in quarantine. If the timer 166 determines that the expired temporary disposable number has been in the quarantine database 176, for example, for more than six months without being renewed by the previous user, the number manager 170 can release the expired temporary disposable number to the general public for selection by placing the temporary disposable number back into the population pool (e.g., into the number database 174).

The usage manager 172 can determine whether a temporary disposable number linked to a mobile device has reached its limited usage. If a third-party attempts to reach a subscriber at a temporary disposable number with a twenty call limit, but twenty calls to the user at the temporary disposable number have already been made, the usage manager 172 can notify the activation manager 134 to temporarily suspend the temporary disposable number until the user replenishes the account with sufficient credits.

The usage manager 172 can define the expiration period for the temporary disposable number in various ways. For example, the usage manager 172 can store one or more parameters associated with the expiration of a temporary disposable number in the database 140. For instance, the usage manager 172 can compile and store in the database 140 a table or other suitable data structure storing various fields such as the number of instances that the temporary disposable number has been used, the number of incoming calls received at the temporary disposable number, a predefined time period that the temporary disposable number is valid effective (e.g., the number of hours, the number of days, the days of the week, and so on), or the area code of the calling party (e.g., where the temporary disposable number is only effective for calls made from a local area code (415) and the like).

If the usage manager 172 determines that an existing temporary disposable number has expired, the usage manager 172 can notify the account manager 164 to reject all future calls, and provide a call failure notification to all future callers who are trying to reach the user at the expired temporary disposable number.

As discussed above, the user can purchase "shuffle" credits. Each time an expired temporary disposable number is renewed or a new temporary disposable number is requested, the counter 168 can be decremented. For example, where the user has requested to change a temporary disposable number currently in use to a new one that has a different area code (e.g., to avoid roaming charges), the counter 168 can be decremented (e.g., by one) upon activating the new temporary disposable number and deactivating the old temporary disposable number. When the counter 168 reaches zero, indicating that all remaining shuffles have been exhausted, the counter 168 can communicate with the billing manager 162 to prompt the user to purchase credits.

The counter 168 also can provide the function of counting, for example, a number of times the user has renewed a particular temporary disposable number, or quantity of temporary disposable numbers used or renewed within a specified period. These data can then be relayed to the account manager 164 for account management. For example, the account manager 164 can use these data to determine whether the user is abusing the temporary disposable number feature as an attempt to exhaust all of the available inventories of new temporary disposable number. As another example, the account manager 164 can use these data to identify whether the user should be given a promotional deal or different pricing structure for the frequent needs of a temporary disposable number. As yet another example, the account manager 164 can use these data to determine whether additional, new temporary disposable numbers should be obtained or expired temporary disposable numbers quarantined to ensure a healthy inventory of available numbers for user selection.

The usage manager 172 can function to validate the usage of each temporary disposable number. As discussed above, the account manager 164 can allow the user to specify a usage of a temporary disposable number. For example, the user can, at the time of selection and activation (or after the selection and activation), specify that the temporary disposable number is to be used only for twenty calls, after which the temporary disposable number expires. The billing manager 162 also can bill the user based on the specified usage. For example, the user can be billed $1 for a five-call usage, $2 for a ten-call usage, or $3 for a twenty-call usage.

Once the user specifies a usage need, the usage manager 172 can track the usage of the temporary disposable number on an hourly, daily, or weekly basis. Each time a call is received at the temporary disposable number, the usage manager 172 also can decrement an internal counter (or the counter 168) by one. When the usage has reached the allotted limit, the usage manager 172 can prompt the user that the shelf life of the temporary disposable number has ended, and additional credits will be needed for the continuous use of the temporary disposable number.

In some implementations, the account manager 164 also can maintain a log associated with each temporary disposable number. For example, the log can include, without limitation, (1) the identity of the caller (e.g., the number from which the incoming call is made, and if the number is in the user's address book, the name of the caller), (2) the time at which an incoming call was made, (3) the particular temporary disposable number to which a call was made (e.g., where the user has several temporary disposable numbers), (4) status of the incoming call (e.g., whether the incoming call was answered or missed), (5) the duration of the incoming call (e.g., total time occurred), and (6) geographic information associated with the incoming call (e.g., the city, state/province, and country from which the incoming call was made). The log allows the user to track and monitor all inbound and outbound calls, and deactivate any particular temporary disposable numbers where the log shows suspicious calling activities. Also, the log provides a user with a history of all past call events that allows the user to view missed calls and numbers from which calls are made to the temporary disposable number.

Once the user account 142 is activated, the user can proceed to renew an expired temporary disposable number or request a new temporary disposable number. In some implementations, the user can start using the selected temporary disposable number nearly instantaneously so that third parties can immediately contact the user at the temporary disposable number without further interruption.

In some implementations, a single submission of data (e.g., user ID 118a) to the TSP system 120 can enable the user to acquire an account to use the temporary disposable number service without any need to provide other personal data (e.g., contracting, billing, configuration, or other information) to activate the selected temporary disposable number. As discussed above, the user can be provided with, for example, three temporary disposable numbers initially at no charge. The user can be prompted to create an account after all three temporary disposable numbers have expired.

The term "single submission," such as single submission of data, can refer to sending, providing, or transmitting sufficient data to activate or request telecommunications services from an interface without requiring an interface transition to provide additional data to request the same telecommunications services. An example single submission of data can be clicking a button on a graphical user interface (e.g., "submit", "send", or "activate" buttons, or the like) on a mobile device.

The user can create an account using the user interface 110. The user interface 110 can include physical interfaces and/or virtual interfaces (e.g., a web page, panel, window, display, palette, tab, screen, or the like in an application program running on the mobile device or the web browser). Further, the TSP system 120 can include one or more servers, software applications, application programmable interfaces (APIs), logic (e.g., software or electrical/hardware logic), or any combination thereof. For example, any of the provisioning manager 132, configuration manager 133, activation manager 134, validation manager 136, billing manager 162, account manager 164, timer 166, counter 168, number manager 170, and usage manager 172 can be implemented in hardware, software, or any combination thereof.

Example Processes for Instant Activation of a Temporary Disposable Number

Figure 4A:
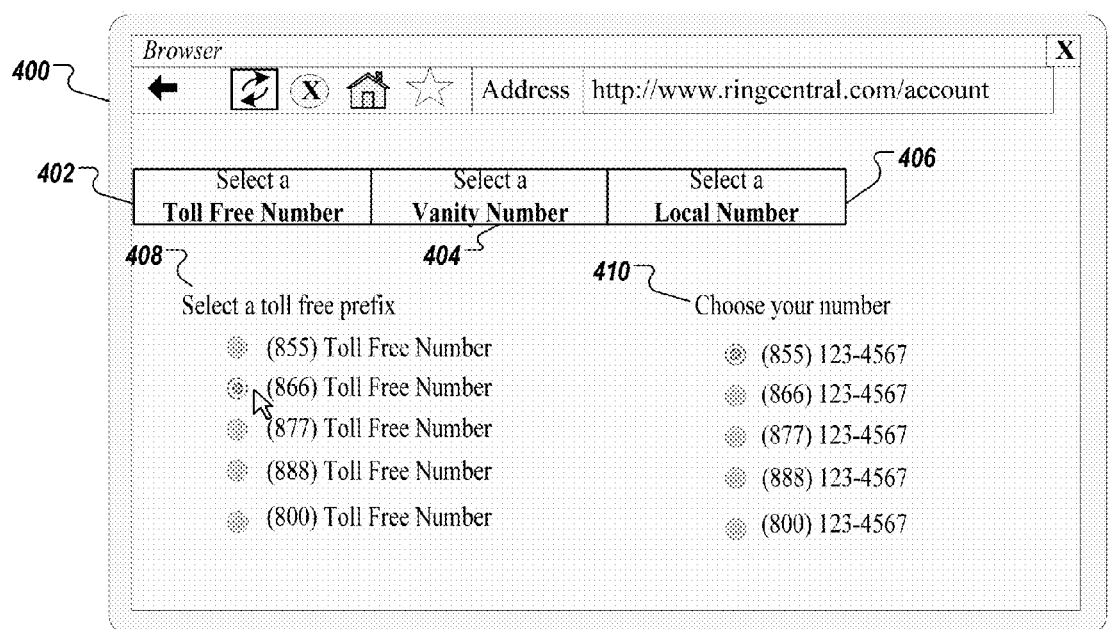
FIG. 4A shows an example of a temporary disposable number selection interface accessible via a browser.
Figure 5:
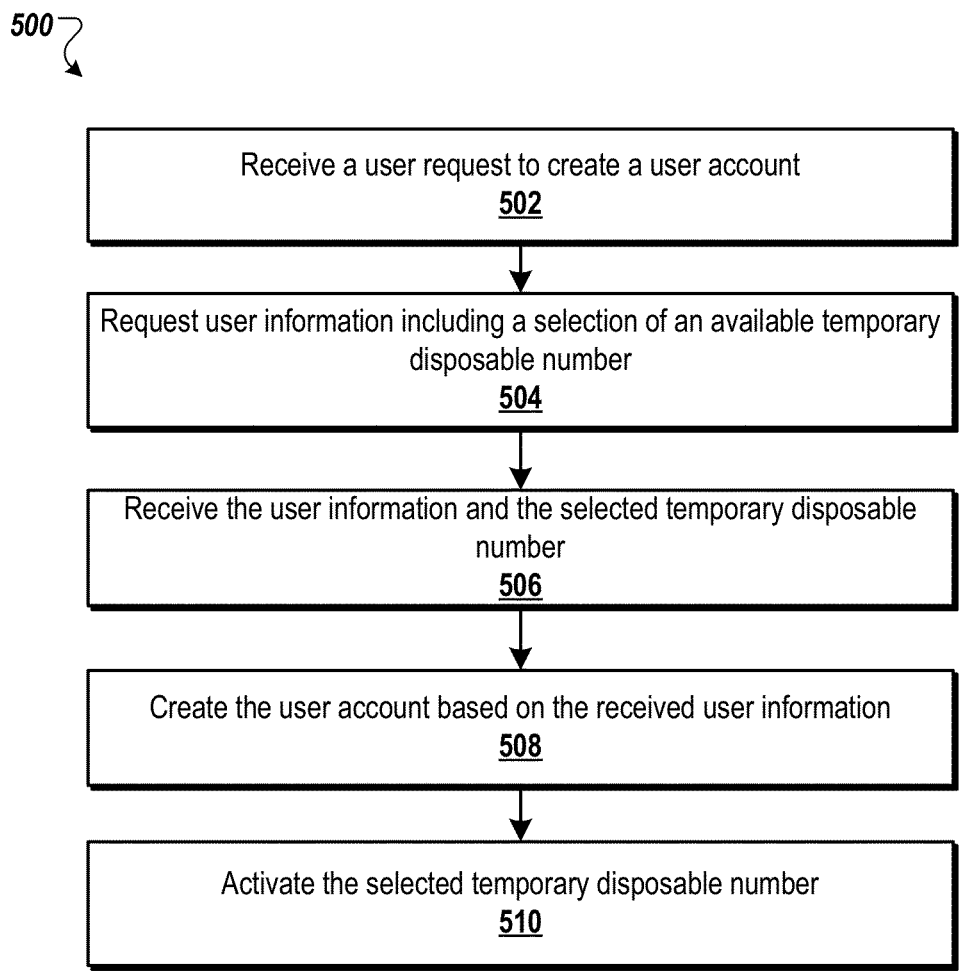
FIG. 5 shows a flow chart of an example process for activating a temporary disposable number.

FIG. 5 shows a flow chart of an example process 500 for activating a temporary disposable number. For the sake of completeness and thoroughness, FIG. 5 will now be described in conjunction with FIGS. 2A/2B and FIGS. 4A/4B. Also, the operations described in process 500 are not to be construed as necessarily requiring their performance in the particular order discussed or illustrated, unless specifically identified as an order of performance. It is also to be understood that additional or alternative operations may be employed.

Referring to FIG. 5, the process 500 begins with receiving a user request to create a user account (502). For example, the TSP system 120 can receive the user request from the mobile device 102. FIG. 2A shows an example application executed on a mobile device that can be used to transmit the user request.

Temporarily referring to FIG. 2A, the "RingCentral" icon 210 represents an application that can be invoked by a user input selecting it with a pointing device or touching it on the touch sensitive screen of the mobile device 102. The application can be configured to run as a default program and can be activated whenever the mobile device 102 is first turned on. If desired, one or more functions of the application can be implemented as separate modules that each has its respective icon and can be invoked separately. For example, the activation and configuration functions can be implemented as a separate module from the telephone/voicemail module. Once the application icon 210 is invoked, a user interface can be presented offering a user the option to use or configure an existing user account, or to activate and configure a new subscriber account.

Figure 2B:
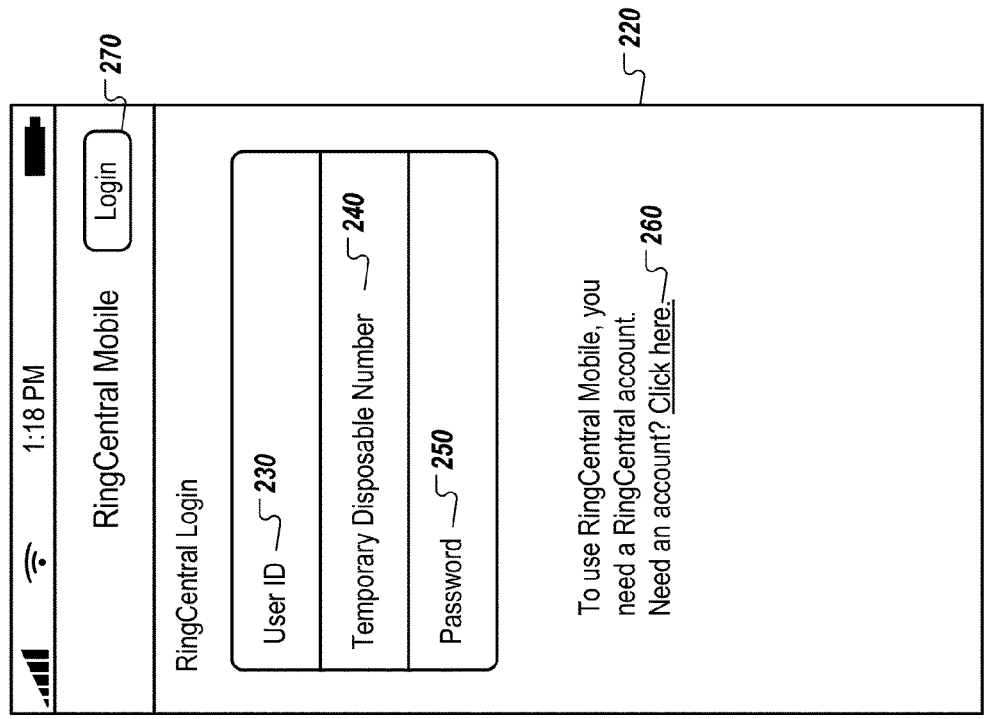
FIG. 2B shows an example user interface for choosing whether to log into an existing user account or to activate a new user account.
Figure 2A:
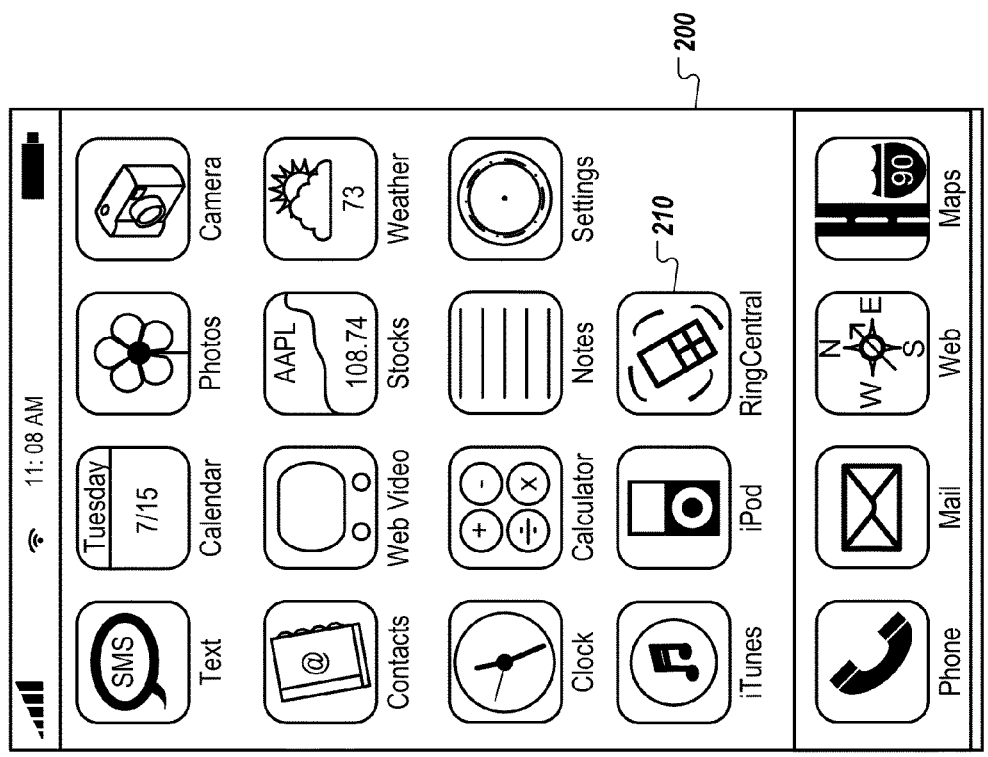
FIG. 2A shows an example application executed on a mobile device.

FIG. 2B shows an example user interface 220 for choosing whether to log into an existing user account or to activate a new user account. To log into an existing user account, a user can enter a user identifier 230 (e.g., user IDs 118a/118b), and corresponding authentication password in the password field 250.

Optionally, the user can enter a temporary disposable number 240 in place of or in addition to the identifier 230 to access the user account. After completing the identifier and password information in the appropriate fields, the user can proceed to log into the account by selecting the login button 270 on the user interface 220. In some implementations, the user can set up the application to remember the identifier and password, and automatically populate the requisite fields when the user invokes the application. An option to create a new account also can be presented as a button or a link 260 that invokes a different user interface where a user can enter requisite information to create and activate a new account.

In general, when a user runs the application on the mobile device 102, the application generates a user interface on the mobile device 102 for the user to login as an existing user or to setup a new account. If the user logs in as an existing user, the application communicates with the TSP system 120 with the request to login and the login information. The application then receives information pertaining to the account corresponding to the login information from the TSP system 120, and presents an interface containing information previously submitted by the user and other information pre-set by the TSP system 120. The user can proceed to modify the information (such as through edit) or use the services available to this account.

During the account activation process, the application stores the user inputs until the user is ready to submit the information. Once the user selects to activate the service by clicking on a "submit" or "finalize" button, the application can send the information to the TSP system 120, for example, in a single submission to update the account information or send the request for services to the TSP system 120. The application can communicate with the TSP system 120 during services according to the normal client-server processes applicable to other forms of communication means (e.g., a web version of a call controller).

Referring back to FIG. 5, at 504, user information including a selection of a temporary disposable number is requested. If a user selects the option to create a new account, the application can send a request to the TSP system 120 (e.g., the account manager 164) to create a new account. In response, the TSP system 120 can request the user to provide user information such as, for example, the mobile phone number of the mobile device 102, and personal contact information such as name, address, email, and the like.

Upon receiving the user information, the TSP system 120 can check whether there are available temporary disposable numbers in the number database 174. If so, the TSP system 120 can present to the user a user interface displaying a pool of available temporary disposable numbers for user selection. In presenting the pool of available temporary disposable numbers to the user, the TSP system can cycle through each number to ensure that each available temporary disposable number is displayed at least once for selection.

After displaying the listing of available temporary disposable numbers, the user can select a temporary disposable number from the pool. FIG. 4A shows an example of a temporary disposable number selection interface 400 accessible via a browser (e.g., browser 160) in which a pool of available temporary disposable numbers can be displayed to the user.

Optionally, in lieu of or in addition to the number database 174, the pool of available temporary disposable number can be stored in the database 140. The database 140 also can maintain a mapping between a temporary disposable number and the permanent number associated with the user's mobile device 102 to which the temporary disposable number is to be linked. The database 140 also can store many such records associating each of a plurality of temporary disposable numbers with a respective permanent number.

The number manager 170 can provide the user with several categories of available temporary disposable numbers from which one can be selected for use. Temporarily referring to FIG. 4A, in some implementations, the user can be presented with three options each providing a different group or category of available temporary disposable numbers; namely a toll-free number tab 402 listing one or more available temporary disposable toll-free numbers, a vanity number tab 404 listing one or more available temporary disposable vanity numbers, and a local number tab 406 listing one or more available temporary disposable local numbers (e.g., local to the number of the mobile device to which the temporary disposable number is to be linked). Where a user has selected to view a listing of available toll-free numbers, the user also can be presented with additional options 408 for selecting one of several available toll-free prefixes. Based on the selected prefix, the user can be presented with a pool of available temporary disposable toll-free numbers 410 having the selected prefix.

The number manager 170 can execute a number selection algorithm in presenting the available pool of temporary disposable numbers (e.g., as opposed to being generated at random). For example, the number manager 170 can consider various user-related parameters, and "optimize" the listing based on these user-related parameters. As an example, the number manager 170 can consider (1) the area code of the permanent number (e.g., number of the mobile device 102), (2) the last number linked to the user (e.g., as retrieved from a log compiled by the account manager 164 as discussed above), (3) a current geographic location of the user, (4) complexity of the available numbers (e.g., whether one number is easier to memorize than other available numbers), and (5) past number selection (e.g., adjusting number recommendation based on past numbers that the user previously selected). The number manager 170 also can consider popular numbers or numbers that other users have selected frequently, numbers with the least amount of calls, or numbers that are rarely selected as temporary disposable numbers. Based on these user-related parameters and factors, the number manager 170 can present, for example, the top three numbers to the user for selection.

On the mobile device 102, the user also can be displayed with a temporary disposable number selection interface similar to that shown in FIG. 4A. FIG. 4B shows an example temporary disposable number interface 420 suitable for display on the mobile device 102 and presenting several available temporary disposable numbers to the user. As shown in FIG. 4B, the interface 420 can be displayed to the user upon logging into the TSP system 120 (e.g., after authentication using interface 220 shown in FIG. 2B), and identifies three temporary disposable numbers from which one can be selected by the user for use.

Referring back to FIG. 5, at 506, the user information and the selected temporary disposable number are received. Before activating the selected temporary disposable number, the TSP system 120 can also request additional requisite information. For example, the TSP system 120 can request the user to specify the shelf life of the selected temporary disposable number (e.g., 3 days, 5 days, or 7 days), or the number of calls for which the selected temporary disposable number is valid (e.g., valid for twenty calls).

At 508, a user account can be created based on the received user information. For example, once the user provides all requisite information, and clicks on an activation button, the application can send all the information necessary for account creation and activation to the account manager 164. The application can then optionally wait for the account manager 164 and the activation manager 134 to respond with a successful activation confirmation (e.g., confirmation via email, SMS, MMS, and the like). If there are not sufficient temporary disposable numbers in the database 140, the application can display a message to the user stating that there is no available number at this time, and ask the user to try later.

At 506, the selected temporary disposable number can be activated. For example, the account manager 164 can create the user account, and the activation manager 134 can activate the selected temporary disposable number, and notify the user that the new user account and the selected temporary disposable number are both activated and are now ready for use.

As discussed above, the user can set up a call-forwarding rule at the time of requesting a temporary disposable number such that calls made to the temporary disposable number are forwarded to the member's voicemail, or to another number (e.g., home, office, etc.) (e.g., a call made to a selected temporary disposable number is forwarded to the member's home number). At the time of selecting a temporary disposable number, the user also can set up a mailbox to which calls ignored or missed by the member are forwarded (e.g., instead of forwarding to a home or office number). If desired, at the time of selecting a temporary disposable number, the user also can specify more than one forwarding number to be rung sequentially or simultaneously when a caller calls the temporary disposable number. For example, the user can specify three call forwarding numbers, and each of these three call forwarding numbers can be rung sequentially based on the orders in which the call forwarding numbers are listed (e.g., if the user does not pick up the call at the first forwarding number, then the TSP system then forwards the call to the second forwarding number). As another example, a call forwarding setting can be established to allow each of these three call forwarding numbers to be rung simultaneously so that devices associated with these call forwarding numbers can be simultaneously rung at the time of receiving an incoming call at the user's temporary disposable number Example Processes for Changing an Existing Temporary Disposable Number Once a temporary disposable number is activated, the user can begin receiving incoming calls at the temporary disposable number. In some implementations, the temporary disposable number is only valid for incoming calls and not for outgoing calls (e.g., the user cannot dial out to other parties using the temporary disposable number). Also, where a user is not available to answer an incoming call at the temporary disposable number, the TSP system 120 can forward the call to the user's home number, office number, or to an email voicemail service as specified by the user at the time of activating the temporary disposable number.

As discussed above, each temporary disposable number can be specified with a shelf life. When the shelf life of the temporary disposable number expires, the user can purchase additional "credits" to extend the shelf life of the temporary disposable number. The user also can extend the shelf life of the temporary disposable number prior to its expiration.

In some instances, at the end of or during the shelf life of the temporary disposable number, the user might want to change the temporary disposable number to a different number. For example, a business owner might want to change an existing temporary disposable number (e.g., with a local number (415) 123-4567) to a toll free number (e.g., (800) 123-4567) so that incoming calls made to the temporary disposable number can be charged to the business instead of the caller. As another example, a small business owner with a portable business might want to switch from a temporary local number (e.g., (212) 123-4567 based in New York) to another temporary number with a different area code (e.g., (415) 123-4567 based in San Francisco) because the small business owner is now promoting the business in San Francisco, and wants all potential and prospective customers in San Francisco to be able to contact the small business owner at a local number. As yet another example, an online tire seller might want to switch from one temporary disposable number local number (e.g., (650) 123-4567) to another temporary disposable number local number (e.g., (650) 123-TIRE) because the suffix contains the term "tire," which is easier for customers to memorize.

Figure 6:
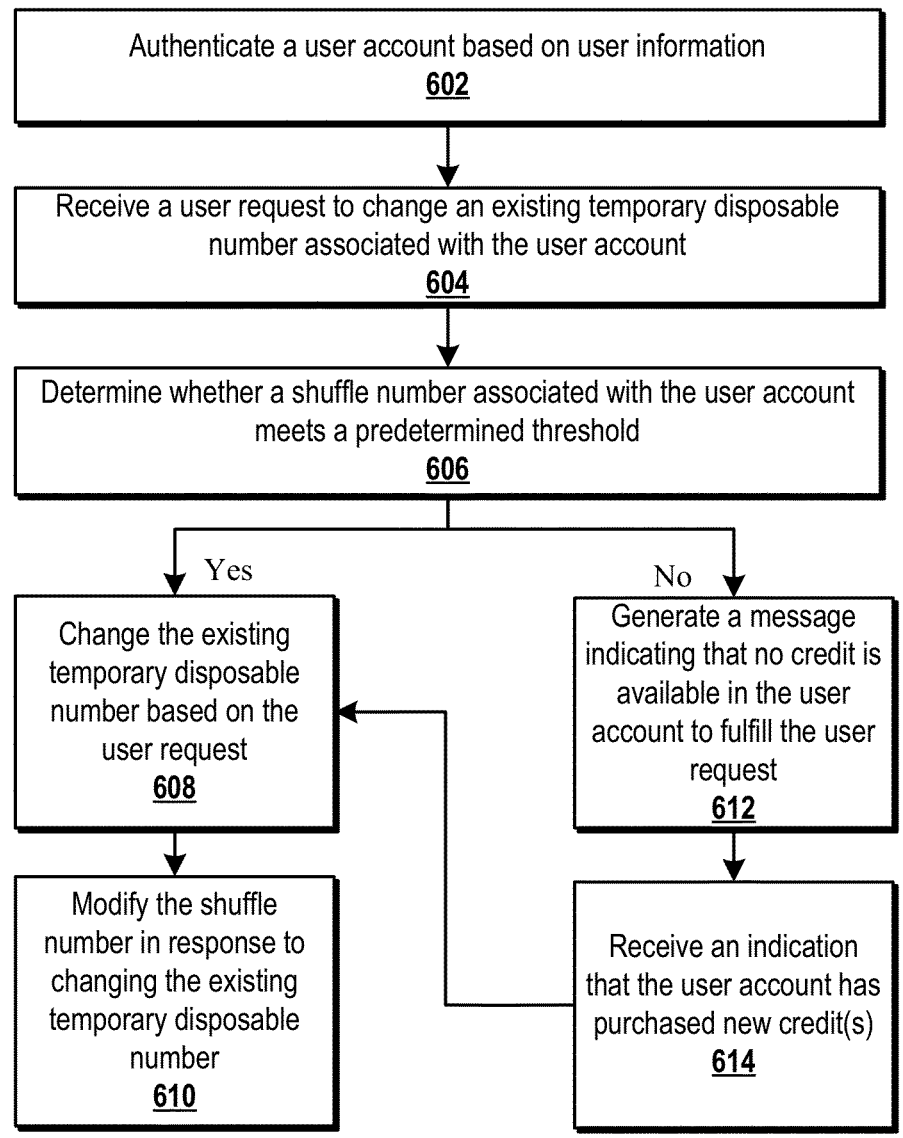
FIG. 6 shows a flow chart of an example process for changing an existing temporary disposable number.

FIG. 6 shows a flow chart of an example process 600 for changing an existing temporary disposable number. FIG. 6 will now be described in conjunction with FIGS. 4C and 4D. The operations described in process 600 are not to be construed as necessarily requiring their performance in the particular order discussed or illustrated, unless specifically identified as an order of performance. It is also to be understood that additional or alternative operations may be employed.

At 602, a user account is authenticated based on user information. For example, a user logs into an existing user account (e.g., using the user ID 118*a*/118*b*) via a user interface running on the user's mobile device 102 (e.g., interface 220 shown in FIG. 2B) or the browser 160, and the provisioning manager 132 can authenticate the user input to ensure that the user is an authorized user with an existing user account.

At 604, a user request to change an existing temporary disposable number associated with the user account is received. For example, once the user is authenticated, the user can navigate to, for example, the user interface 420 shown in FIG. 4B and click on the "Select a different number" button 422 to initiate the process for changing the existing temporary disposable number (e.g., changing the existing temporary disposable number "(408) 555-1212" to "(209) 555-1212"). The selection interface 420 can visually identify the temporary disposable number currently in use by the user using an indicator 424. Upon clicking on the "Select a different number" button 422, the user can be presented with a switching interface for switching out the existing temporary disposable number. FIG. 4C shows an example switching interface 430 suitable for assisting the user in selecting a new temporary disposable numbers.

Temporarily referring to FIG. 4C, the switching interface 430 can be presented to the user where the user wishes to change an area code of an existing temporary disposable number that is currently in use by the user. As shown in FIG. 4C, the interface 430 can provide an area code field 432 in which the user can enter a desired area code. For example, the area code can be a local area code or a toll free prefix (e.g., 888, 800, 899, etc.). Upon entering the desired area code in the area code field 432, the user can select the "Display Numbers" button 434 to retrieve a pool of available temporary disposable numbers having the desired area code for display in the "Available phone numbers" section 436. For example, where the user has entered an area code "209" in the area code field 432, the number manager 170 can retrieve three new temporary disposable numbers having the "209" area code (e.g., "209-555-1212," "209-555-7865," and "209-555-6547") that are available for user selection.

Referring back to FIG. 6, at 606, whether a shuffle number associated with the user account meets a predetermined threshold is determined (e.g., by the counter 168). For example, when the number manager 170 has received a new number selection from the user, the billing manager 162 can check the database 140 to determine whether the current shuffle number indicates that the user has sufficient credit to fulfill the request (e.g., to terminate a currently-in-use temporary disposable number and activate a new temporary disposable number).

A shuffle interface also can be presented to the user identifying the permanent number associated with the account (e.g., the mobile device's phone number), the new temporary disposable number, and the number of remaining shuffles in the user account. FIG. 4D shows an example shuffle interface 440 displaying such information. In some implementations, the example shuffle interface 440 can be displayed to the user once the user has selected a new temporary disposable number, or in the alternative, after the user has confirmed a change to the new temporary disposable number.

Temporarily referring to FIG. 4D, in addition to displaying the permanent number (e.g., 415-555-9876) and the temporary disposable number currently linked to the same permanent number (e.g., 209-555-1212), in some implementations, the shuffle interface 440 also displays an indicator 442 showing the available "shuffles" remaining. Specifically, the indicator 442 can indicate to the user that the user can again change the temporary disposable number currently in use to a different temporary disposable number, for example, three more times beyond which additional credits will need to be purchased before the user can request any further change to the existing temporary disposable number.

For example, each time the user changes the area code of an existing temporary disposable number (e.g., by pressing the "Shuffle" button 444), upon user confirmation, the counter 168 is decremented by one. In some implementations, when the counter 168 shows "zero" shuffles remaining, the user will not be allowed to change the existing temporary disposable number again. When the term for the existing temporary disposable number expires, the user will need to purchase additional credits before a new temporary disposable number can be provided to the user, or a previously-linked temporary disposable number can be reinstated and used by the user again.

When the term for the existing temporary disposable number expires, the expired temporary disposable number can be quarantined in the quarantine database 176 for a predetermined period before it is released to other users for selection. This quarantine process allows the expired temporary disposable number to be set aside and not commingled or be associated with other new, never-linked temporary disposable numbers in the number database 174 while providing the user with an option to renew the expired temporary disposable number (e.g., within a predetermined amount of time or in the near future). To ensure a healthy number of temporary disposable numbers available to other users for selection at all times, the TSP system 120 can specify a time period during which the user must renew the expired temporary disposable number before the TSP system 120 circulates the expired temporary disposable number to other users for selection.

The TSP system 120 also can link a temporary disposable number in response to a request (e.g., from a user who has subscribed to a temporary disposable number service). For example, the TSP system 120 can link a temporary disposable number based on a predetermined schedule set by the user. As an example, the TSP system 120 can link a new temporary disposable number to the user's mobile device for use each day, each week, or any other user-specified time period. As another example, the TSP system 120 can automatically link a new temporary disposable number to the user when the term of a previously linked temporary disposable number has ended (assuming the user has a non-zero shuffle count in the account). The TSP system 120 also can link a temporary disposable number that is effective only for twenty uses (or any other number of uses as the user or the TSP system 120 specifies). Depending on the pricing structure, the TSP system 120 can tailor the term for each temporary disposable number accordingly.

For example, a seller might have already received four phone calls at a designated mobile device in accordance with the temporary disposable number that has a term of five calls. After receiving a fifth call at the temporary disposable number, during or at the completion of the fifth call, the account manager 164 can link a new temporary disposable number which can be used to reach the user's mobile device. For example, the new temporary disposable number may be good for another five uses, after which it will expire and yet another new temporary disposable number may be linked to the user. In these examples, the user also can request in advance that the temporary disposable number automatically linked by the TSP system 120 has a particular area code, which may be the area code in which the user's mobile device is currently located, the user's home area code, or any other area code. This option allows a user to appear to have a presence in an area that the user is not otherwise connected to.

In some implementations, the account manager 164 allows the user to specify the number of uses that the new temporary disposable number to be linked should have. Alternatively, or in addition, the account manager 164 allows the user to specify the shelf life of the temporary disposable number linked.

After a temporary disposable number has been linked, the activation manager 134 can notify the user of the temporary disposable number linkage via, for example, a text message, an automated voicemail, a SMS message and/or MMS message to the user's mobile device or at the permanent telephone number, the temporary disposable number, or other desired phone number. In this manner, the user can begin to use the temporary disposable number and provide the temporary disposable number to third-parties with whom the user wishes to establish two-way communications for a certain limited period of time.

If there is sufficient credit in the user account, at 608, the existing temporary disposable number can be changed (e.g., to a temporary disposable number having a different area code, or a toll-free number) based on the user request. For example, if the user has requested a new temporary disposable number and there is credit available for such a transaction, the account manager 164 executes the change; the timer 166 sets a start time of the new temporary disposable number (and notify the number manager 170 when the shelf life of the new temporary disposable number has ended); the counter 168 deducts one credit from the remaining available shuffles; and the number manager 170 updates the number database 174 to remove the new temporary disposable number from future selection by other users.

A temporary disposable number selection interface (e.g., interfaces 4A/4B) also can be presented to the user for selecting a new temporary disposable number, at which time the user also can specify the desire area code. If the user does not choose any one of the new temporary disposable numbers presented in the temporary disposable number selection interface (e.g., the numbers shown do not fit the user's needs), the user can request a different set of temporary disposable numbers for presentation. Once a selection is made, the account manager 164 can store the new temporary disposable number in the database 140.

Similarly, if the user requests to extend the expiration date of an existing temporary disposable number, where credit is available, the timer 166 (or the usage manager 172) can reset the validity period for which the temporary disposable number is valid (e.g., extend the temporary disposable number for another five days). Once the timer 166 (or the usage manager 172) resets the validity period (or usage), the counter 168 can deduct a corresponding credit from the user account.

At 610, the shuffle number is modified in response to changing the existing temporary disposable number to a new temporary disposable number. For example, the counter 168 can decrement the user's remaining shuffle number by one to reflect the transaction.

At 612, a message is generated indicating to the user that no credit is available in the user account to fulfill the user request. For example, when the counter 168 is zero, the billing manager 162 and the account manager 164 can generate a message to the user (e.g., for display on the mobile device 102) indicating that the user has no shuffle left in the user account, and prompt the user to purchase credits. At this time, the user request can be suspended until the user account 142 is replenished with new credits.

At 614, an indication is received (e.g., by the billing manager 162) that the user account has purchased new credits. As discussed previously, the billing manager 162 can provide a billing interface through which the user can enter appropriate billing information, for example, to purchase additional shuffle credits. Once the purchase is complete, the billing manager 162 can update the user account (and the database 140) to show the number of shuffles purchased. The user can then use the new credits to extend the shelf life of an existing temporary disposable number, or request a new temporary disposable number.

Example Processes for Purchasing Credits

Figure 7:
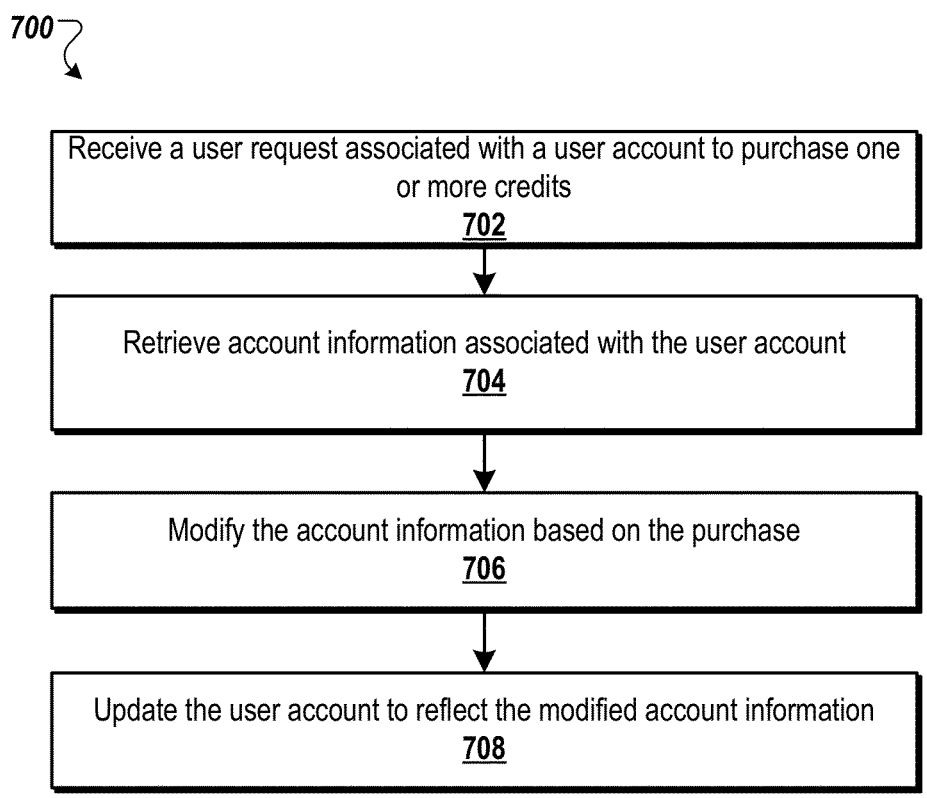
FIG. 7 shows an example process for purchasing credits.

In addition to purchasing credits directly from the account manager 164 (e.g., by navigating to the account page under the user account), a user also can purchase credits from outside vendors (e.g., Apple® or Google®) designated by the TSP system 120 as authorized sellers or "dealers." The billing manager 162 then can be configured to interface with these outside vendors externally to ensure proper accounting and timely update of the user account to reflect these purchases and transactions. FIG. 7 shows an example process 700 for purchasing credits required to, for example, extend a shelf life of a temporary disposable number or request a new temporary disposable number. The operations described in process 700 are not to be construed as necessarily requiring their performance in the particular order discussed or illustrated, unless specifically identified as an order of performance. It is also to be understood that additional or alternative operations may be employed.

At 702, a user request associated with a user account to purchase one or more credits is received. For example, the user request can be received from an account API executed by the application running on the mobile device 102. As another example, the user request can be received from a third party vendor with whom the user also has an existing account. The user request also can specify a number of credits to be purchased.

When the billing manager 162 has received the user request or information identifying the user request (e.g., from a third party vendor), at 704, the billing manager 162 can retrieve the account information associated with the user account and proceed to complete the transaction with the user directly. Where the user has purchased credits from an outside vendor or seller, the transaction information can be relayed to the billing manager 134.

At 704, the account information associated with the user account is modified. For example, where the user has purchased three temporary disposable numbers (either directly with the billing manager 162 or from a third-party seller), the billing manager 162 can modify the user's account information to reflect these additional three temporary disposable numbers, and the counter 168 can be updated to show three shuffles remaining in the account.

In lieu of purchasing credits, other forms of payment can be used, such as a credit for the user viewing certain content (such as displaying mobile ads to the callers (and/or to the user)). Where landlines are used, radio ads also can be utilized. For example, the user can create an account with a designated Interactive Voice Recognition (IVR) system, and listen to an audio ad provided by the IVR system. When the audio ad is completed, the IVR system can communicate with the billing manager 162, at which time the user will be properly credited.

As another example, the user can opt in (either with the TSP system 120 or a third-party with whom the TSP system 120 communicates) to listen to radio ads (e.g., the user can specify with the account manager 164 that a radio ad be played before or after a call is made to the temporary disposable number, after which the account manager 164 can credit the user account 142 for listening to the radio ad). In this example, the TSP system 120 can extract one or more ads locally stored (e.g., as received from an ad publisher), and play the ad either in advance of receiving any call at the temporary disposable number, or at the time the call is received at the temporary disposable number.

As yet another example, the number manager 170 can control which ads are to be played, at which number, with what frequency, and/or by which user area code. For temporary disposable numbers that have been shuffled or deleted, the number manager 170 also can display an ad to all callers promoting, for example, the temporary disposable number feature. In this example, because inactive numbers (or deleted numbers) are placed in the quarantine database 176, when a call is made to an inactive number, an audio recording can be played notifying the caller that the number is not currently in service, and encouraging the caller to visit the website hosted by the TSP 120 to learn more about the status of the inactive number as well as the ways in which to get in contact with the user (e.g., where the user has a different temporary disposable number). The number manager 162 also can provide credit as part of daily deals (e.g., deals from Groupon® or LivingSocial®) based on where the user or the callers are located in recommending an appropriate offer.

The user also can create a personal message or greeting for display/presentation to all callers when calls are made to the user's temporary disposable number(s). For example, the user can create a personal message (e.g., as provided by the account manager 164) stating that "If you're calling about the tickets sales, you must be able to pick them up by 3:30 pm today." The personal message can be stored in the database 140 as part of the configuration data 140 associated with the user account 142. When a call is made to the temporary disposable number, the TSP 120 can retrieve the personal message from the database 140, and play the personal message to the caller. When the temporary disposable number is deleted or shuffled back into the quarantine database 172, the number manager 170 also can automatically delete the user's message or personal greeting, and tie new a new message to the deleted temporary disposable number that is to be shown when the deleted temporary disposable number has been linked to another user.

As discussed above, content can be played to the callers (or the user when accessing the IVR system). In these examples, the TSP 120 can monitor content stored in the database 140, and identify a suitable content item to be played to the user or caller based on one or more factors (e.g., to ensure that a content item is played a minimum or maximum number of times). For example, the TSP 120 can consider how frequently a content item has been played, the hour, day, week and/or month played, or the type of temporary disposable number that is called (e.g., whether it is for business or personal). Other demographic factors also can be used in serving the most appropriate content to the user or caller.

As discussed above, in some implementations, the temporary disposable numbers are configured to receive incoming calls only (e.g., users cannot use the temporary disposable numbers for dialing out or calling other parties). In some implementations, the activation manager 164 can provide the user with an option to convert an existing temporary disposable number into a permanent temporary disposable number. Once the conversion has been made, the TSP 120 can reconfigure the user account 142 so that the user can start receiving incoming calls and making outgoing calls and not be restricted to receiving only inbound calls. In some implementations, the user also can request the account manager 164 to allow the user to make outgoing calls to outside parties. The account manager 164 can activate the outgoing line of the temporary disposable number, and the billing manager 162 can charge the user, for example, at a different billing rate for the additional use of the outgoing line.

An Example Mobile Device

Figure 3:
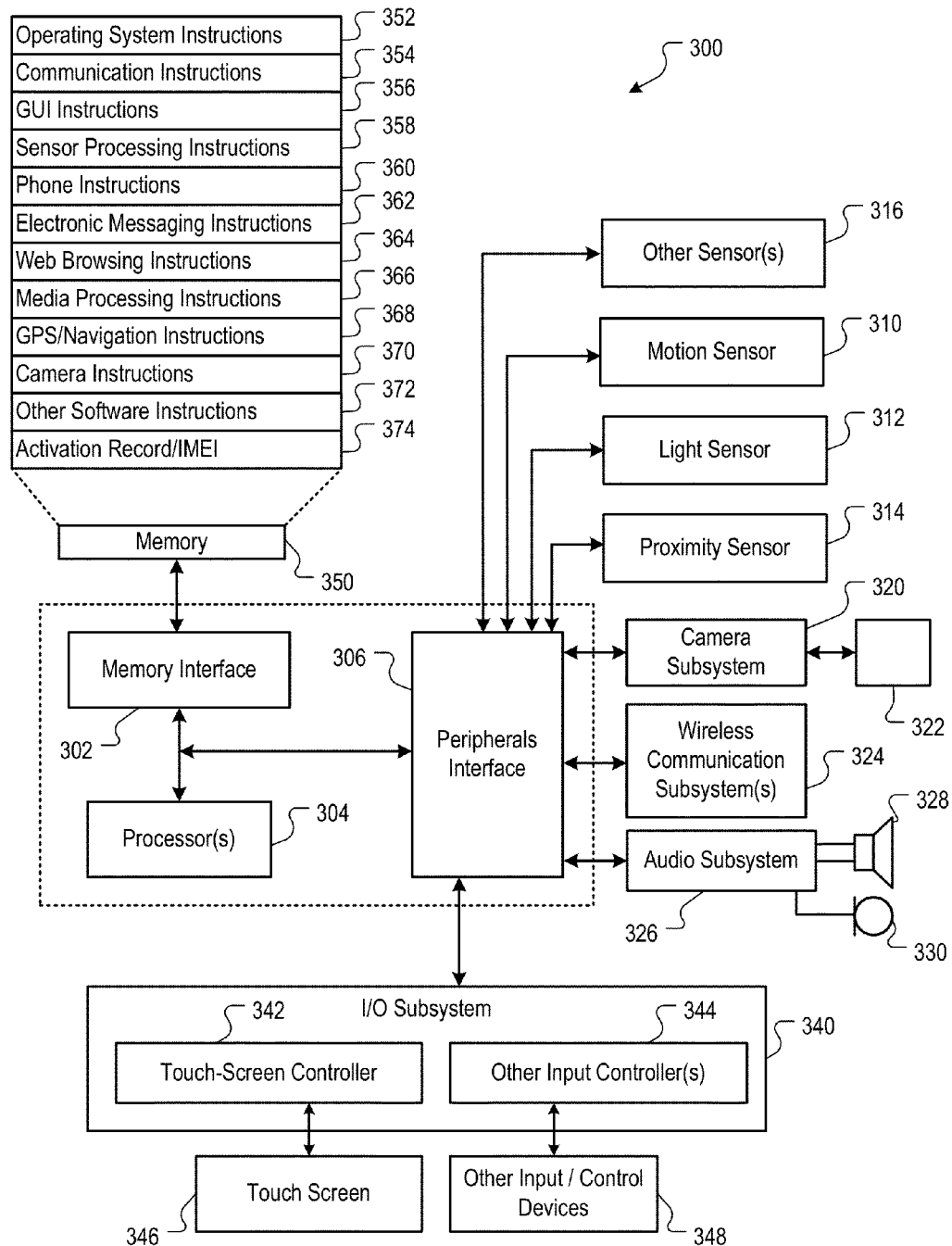
FIG. 3 is a block diagram of an example implementation of a mobile device.

As discussed above, a user can be provided a user interface on the mobile device 102 for activating a temporary disposable number, creating a user account, changing an existing temporary disposable number, or purchasing credits. FIG. 3 is a block diagram 300 of an example implementation of the mobile device 102. The mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the mobile device may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device on or off. The user may be able to customize a functionality of one or more of the buttons. The touch screen 346 can, for example, also be used to implement virtual or soft buttons and/or a keyboard.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., various functions of the virtual PBX services application.

The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Example Computer System

Figure 8:
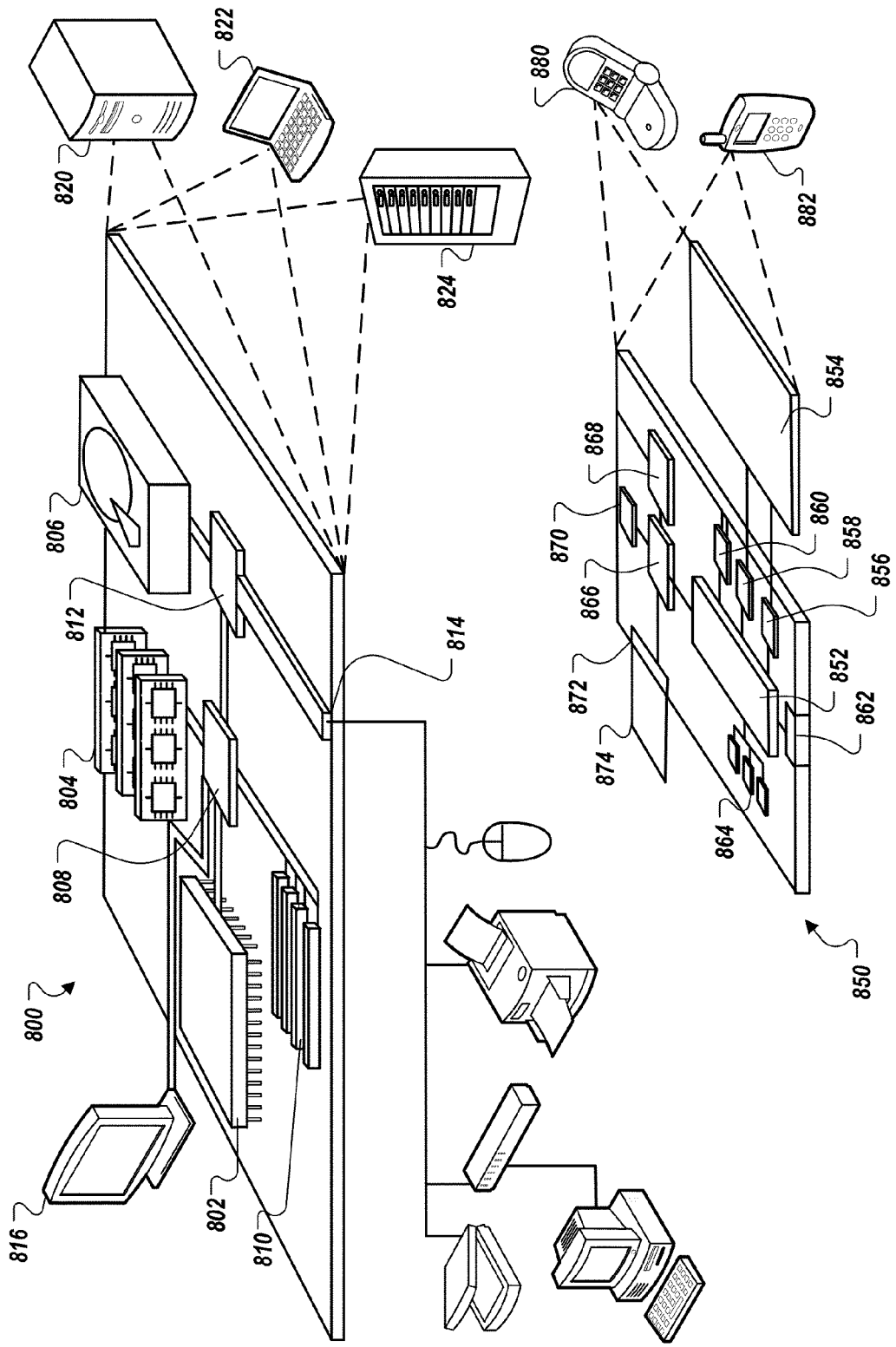
FIG. 8 is a block diagram of a processing device that may be used to execute methods and processes disclosed herein.

FIG. 8 is a block diagram of generic processing device that may be used to execute methods and processes disclosed herein. The system 800 may be used for the operations described in association with the method 300 according to one implementation. The system 800 may also be used for the operations described in association with the method 400 according to another implementation.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In other implementations, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The features described may be implemented in digital electronic circuitry, or in computer hardware, firmware, software, or in combinations of them. In some implementations, the apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. In other implementations, the apparatus may be implemented in a computer program product tangibly embodied in an information carrier for execution by a programmable processor. In some implementations, the information carrier can include a propagated signal.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. A method for operating a telecommunications service provider (TSP) system, comprising:
   presenting, by a computing device operated in the TSP system, a listing of phone numbers for associating with a primary phone number assigned to a communications device;
   receiving, by the computing device, a selection of a temporary phone number from the listing;
   activating, by the computing device, the temporary phone number for a temporary time period in response to the selection;
   forwarding, by the computing device, incoming calls associated with the temporary phone number to the primary phone number during the temporary time period;
   identifying, by the computing device, a termination event deactivating the temporary phone number; and
   reserving, by the computing device, for a quarantine period the temporary phone number for re-association with the primary phone number.

2. The method of claim 1, wherein the quarantine period is proportional to the temporary time period.

3. The method of claim 1, further comprising deactivating the temporary phone number in response to expiration of the quarantine period.

4. The method of claim 1, further comprising, deactivating, by the computing device, the temporary phone number after a selectable number of phone calls.

5. The method of claim 1, further comprising, deactivating, by the computing device, the temporary phone number after a selectable number of days.

6. A method comprising:
   presenting, by a computing device, a listing of phone numbers for associating with a primary phone number assigned to a communications device;
   receiving, by the computing device, a selection of a temporary phone number from the listing;
   activating, by the computing device, the temporary phone number for a temporary time period in response to the selection;
   forwarding, by the computing device, incoming calls associated with the temporary phone number to the primary phone number during the temporary time period;
   identifying, by the computing device, a credit associated with the primary phone number;
   reducing, by the computing device, the credit associated with the primary phone number in response to activating the temporary phone number; and
   deactivating, by the computing device, the temporary phone number in response to detecting the credit associated with the primary phone number falling below a threshold amount.

7. The method of claim 1, further comprising:
   creating, by the computing device, an account associated with the primary phone number;
   activating, by the computing device, the temporary phone number in response to creating the account; and
   deactivating, by the computing device, the temporary phone number in response to terminating the account.

8. The method of claim 7, wherein the account comprises a social network account or an ecommerce account.

9. An apparatus, comprising:
   a computing device configured to:
   identify an account;
   identify a primary phone number associated with the account;
   identify an amount of credits associated with the account;
   associate a temporary phone number with the primary phone number associated with the account based on the amount of credits; and
   forward calls associated with the temporary phone number to the primary phone number.

10. The apparatus of claim 9, wherein the computing device is further configured to:
    deactivate the temporary phone number in response to expiration of an activation period; and
    reserve the temporary phone number during a quarantine period for re-associating with the primary phone number, wherein the quarantine period is proportional to the activation period.

11. The apparatus of claim 9, wherein the computing device is further configured to reduce the amount of the credits in response to associating additional temporary phone numbers with the primary phone number.

12. The apparatus of claim 9, wherein the computing device is further configured to disassociate the temporary phone number with the primary phone number in response to closing the account.

13. The apparatus of claim 9, wherein the account comprises a social network account or an ecommerce account.

14. A memory device having instructions stored thereon that, in response to execution by a processing device, cause the processing device to perform operations comprising:
- receiving a request for associating temporary phone numbers with a primary phone number;
- displaying a listing of the temporary phone numbers in response to the request;
- receiving a first selection of a first one of the temporary phone numbers;
- associating the first one of the temporary phone numbers with the primary phone number;
- reducing an amount of credit in an account associated with the primary phone number in response to associating the first one of the temporary phone numbers with the primary phone number;
- receiving a second selection of a second one of the temporary phone numbers;
- associating the second one of the temporary phone numbers with the primary phone number based on the amount of the credit remaining in the account; and
- reducing the amount of credit in the account in response to associating the second one of the temporary phone numbers with the primary phone number.

15. The memory device of claim 14, wherein the operations further comprise:
- identifying a termination event based on a number of the temporary phone numbers associated with the primary phone number; and
- disassociating the first and second one of the temporary phone numbers with the primary phone number in response to identifying the termination event.

16. The memory device of claim 14, wherein the operations further comprise:
- suspending associating the second one of the temporary phone numbers with the primary phone number if the amount of the credit in the account drops below a threshold value; and
- generating a user notification indicating additional credits are needed to complete the second selection.

17. The memory device of claim 16, wherein the operations further comprise:
- receiving an indication new credits have been purchased and credited to the account; and
- associating the second one of the temporary phone numbers with the primary phone number in response to receiving the indication.

18. The memory device of claim 16, wherein the operations further comprise automatically disassociating the first one of the temporary phone numbers and the second one of the temporary phone numbers with the primary phone number in response to termination of the account.

19. The memory device of claim 14, wherein:
- the account is associated with an ecommerce website; and
- the operations further comprise displaying the first one of the temporary phone numbers to a first user accessing the ecommerce website and displaying the second one of the temporary phone numbers to a second user accessing the ecommerce website.

20. The memory device of claim 14, wherein the operations further comprise reducing the amount of the credit in the account based on a number of the temporary phone numbers associated with the primary phone number.

21. A method comprising:
- receiving, by the computing device, selection of a temporary phone number for associating with a primary phone number;
- activating, by the computing device, the temporary phone number in response to the selection;
- forwarding, by the computing device, incoming calls associated with the temporary phone number to the primary phone number while the temporary phone number is activated;
- identifying, by the computing device, a termination event deactivating the temporary phone number; and
- reserving, by the computing device, for a time period the temporary phone number for re-association with the primary phone number.

22. The method of claim 21, wherein the time period is proportional to an amount of time the temporary phone number is activated.

23. The method of claim 21, further comprising disassociating the temporary phone number with the primary phone number in response to expiration of the time period.

24. The method of claim 21, further comprising:
- identifying, by the computing device, a credit for an account associated with the primary phone number;
- reducing, by the computing device, the credit for the account in response to activating the temporary phone number; and
- deactivating, by the computing device, the temporary phone number in response to detecting the credit for the account falling below a threshold amount.

25. The method of claim 24, further comprising, reducing, by the computing device, the credit for the account in response to associating additional temporary phone numbers with the primary phone number.

26. The method of claim 24, further comprising disassociating, by the computing device, the temporary phone number with the primary phone number in response to closing the account associated with the primary phone number.

27. An apparatus, comprising:
logic circuitry configured to:
- receive a selection of a temporary phone number for associating with a primary phone number;
- activate the temporary phone number for a temporary time period in response to the selection;
- forward incoming calls associated with the temporary phone number to the primary phone number during the temporary time period;
- identify a termination event deactivating the temporary phone number; and
- reserve for a quarantine period the temporary phone number for re-association with the primary phone number.

28. The apparatus of claim 27, wherein the quarantine period is proportional to the temporary time period.

29. The apparatus of claim 27, wherein the logic circuitry is further configured to disassociate the temporary phone number with the primary phone number in response to expiration of the quarantine period.

30. The apparatus of claim 27, wherein the logic circuitry is further configured to deactivate the temporary phone number after a selectable number of phone calls.

31. The apparatus of claim 27, wherein the logic circuitry is further configured to deactivate the temporary phone number after a selectable number of days.

* * * * *